(12) United States Patent  
Liu

(10) Patent No.: US 8,955,643 B2  
(45) Date of Patent: Feb. 17, 2015

(54) MULTI-DEGREE OF FREEDOM RESONATOR ARRAY

(75) Inventor: Zheji Liu, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 14/111,820

(22) PCT Filed: Mar. 29, 2012

(86) PCT No.: PCT/US2012/031244  
§ 371 (c)(1),  
(2), (4) Date: Oct. 15, 2013

(87) PCT Pub. No.: WO2012/145141  
PCT Pub. Date: Oct. 26, 2012

(65) Prior Publication Data  
US 2014/0034416 A1 Feb. 6, 2014

Related U.S. Application Data

(60) Provisional application No. 61/477,530, filed on Apr. 20, 2011.

(51) Int. Cl.  
*G10K 11/02* (2006.01)

(52) U.S. Cl.  
USPC .............................. 181/292; 181/213; 60/725

(58) Field of Classification Search  
CPC .... G10K 11/002; G10K 11/172; F02C 7/045; F04D 29/441; F04D 29/665  
USPC .............................. 181/213, 214, 292; 60/725  
See application file for complete search history.

(56) References Cited

U.S. PATENT DOCUMENTS

| 5,199,172 A | 4/1993 | Runowski |
| 5,249,919 A | 10/1993 | Sishtla et al. |
| 5,340,275 A | 8/1994 | Eisinger |
| 5,400,825 A | 3/1995 | Gethmann et al. |
| 5,421,593 A | 6/1995 | Aritsubo et al. |

(Continued)

FOREIGN PATENT DOCUMENTS

| DE | 42 25 642 C1 | 0/7199 |
| DE | 43 07 094 A1 | 9/1994 |

(Continued)

OTHER PUBLICATIONS

PCT/US2012/031244—International Search Report and Written Opinion mailed Jun. 29, 2012 (6 pages).

(Continued)

*Primary Examiner* — Jeremy Luks  
(74) *Attorney, Agent, or Firm* — Edmonds & Nolte, PC

(57) ABSTRACT

Apparatus and methods for attenuating noise, vibration, and/or acoustic energy in a turbomachine. The apparatus includes a first base plate having first base plate perforations defined therethrough. The apparatus also includes first and second spacers each extending from the first base plate, being spaced apart from each other, and defining a first channel therebetween. The apparatus further includes a first insert disposed in the first channel and having insert perforations defined therethrough, the first base plate, the first and second spacers, and the first insert at least partially defining a first acoustic chamber therebetween, wherein the base plate perforations and the insert perforations are in communication with the first acoustic chamber.

19 Claims, 8 Drawing Sheets

(56) References Cited

U.S. PATENT DOCUMENTS

| | | |
|---|---|---|
| 5,447,413 A | 9/1995 | Maier et al. |
| 5,457,291 A | 10/1995 | Richardson |
| 5,490,602 A | 2/1996 | Wilson et al. |
| 5,539,164 A | 7/1996 | van Ruiten |
| 5,558,342 A | 9/1996 | Sedy |
| 5,613,478 A | 3/1997 | Widmann |
| 5,613,649 A | 3/1997 | Schlinker et al. |
| 5,644,918 A | 7/1997 | Gulati et al. |
| 5,820,300 A | 10/1998 | Sonoda et al. |
| 5,919,029 A | 7/1999 | Van Nostrand et al. |
| 5,923,003 A | 7/1999 | Arcas et al. |
| 5,979,593 A | 11/1999 | Rice et al. |
| 6,082,489 A | 7/2000 | Iwao et al. |
| 6,116,375 A | 9/2000 | Lorch et al. |
| 6,135,238 A | 10/2000 | Arcas et al. |
| 6,139,259 A | 10/2000 | Ho et al. |
| 6,196,789 B1 | 3/2001 | McEwen et al. |
| 6,290,022 B1 | 9/2001 | Wolf et al. |
| 6,309,176 B1 | 10/2001 | Periyathamby et al. |
| 6,347,910 B1 | 2/2002 | Morishige |
| 6,537,028 B1 | 3/2003 | Izumi et al. |
| 6,550,574 B2 | 4/2003 | Liu |
| 6,558,115 B2 | 5/2003 | Tiemann |
| 6,601,672 B2 | 8/2003 | Liu |
| 6,615,950 B2 | 9/2003 | Porte et al. |
| 6,668,039 B2 | 12/2003 | Shepard et al. |
| 6,669,436 B2 * | 12/2003 | Liu .................................. 415/1 |
| 6,854,269 B2 | 2/2005 | Hale |
| 6,863,474 B2 | 3/2005 | Webster et al. |
| 6,918,740 B2 | 7/2005 | Liu |
| 7,017,706 B2 | 3/2006 | Brown et al. |
| 7,021,420 B2 | 4/2006 | Galaitsis |
| 7,080,514 B2 * | 7/2006 | Bland et al. ....................... 60/725 |
| 7,235,915 B2 | 6/2007 | Nakamura et al. |
| 7,337,875 B2 | 3/2008 | Proscia et al. |
| 7,345,594 B2 | 3/2008 | Huang et al. |
| 7,449,821 B2 | 11/2008 | Dausch |
| 7,540,354 B2 | 6/2009 | Morin et al. |
| 7,551,747 B2 | 6/2009 | Huynh et al. |
| 7,556,010 B2 | 7/2009 | Egawa et al. |
| 7,788,926 B2 * | 9/2010 | Johnson et al. ................... 60/725 |
| 7,794,213 B2 | 9/2010 | Gaude et al. |
| 7,967,108 B2 | 6/2011 | Harper |
| 7,984,787 B2 | 7/2011 | Liu et al. |
| 8,061,961 B2 | 11/2011 | Liu et al. |
| 2001/0017232 A1 | 8/2001 | Hogeboom et al. |
| 2003/0031556 A1 | 2/2003 | Mulcaire et al. |
| 2003/0037547 A1 | 2/2003 | Bakran et al. |
| 2003/0161717 A1 | 8/2003 | Liu |
| 2004/0146396 A1 | 7/2004 | Liu |
| 2005/0034918 A1 | 2/2005 | Bland et al. |
| 2005/0076668 A1 | 4/2005 | Choi |
| 2006/0225944 A1 | 10/2006 | Abner et al. |
| 2008/0243001 A1 | 10/2008 | Oakley et al. |
| 2008/0295519 A1 | 12/2008 | Park |
| 2009/0266642 A1 | 10/2009 | Farstad |
| 2010/0189546 A1 | 7/2010 | Liu et al. |
| 2011/0049300 A1 | 3/2011 | Safai et al. |
| 2011/0100315 A1 | 5/2011 | Vichinsky |
| 2012/0237378 A1 | 9/2012 | Huang et al. |
| 2013/0025967 A1 | 1/2013 | Seib |

FOREIGN PATENT DOCUMENTS

| | | |
|---|---|---|
| DE | 100 00 418 A1 | 8/2001 |
| DE | 100 03 395 A1 | 8/2001 |
| DE | 102 36 294 A1 | 2/2003 |
| EP | 0 568 192 | 3/1993 |
| EP | 0 549 402 | 6/1993 |
| EP | 0 573 895 | 12/1993 |
| EP | 0 867 565 | 9/1998 |
| EP | 1 156 266 A2 | 5/2001 |
| EP | 1 340 920 A1 | 9/2003 |
| EP | 1 356 168 A1 | 10/2003 |
| EP | 1 443 217 | 8/2004 |
| EP | 1 559 874 A1 | 8/2005 |
| FR | 2 780 454 | 12/1999 |
| GB | 2 296 557 | 7/1996 |
| JP | H 045475 A | 1/1992 |
| JP | H 05334316 A | 12/1993 |
| JP | H 06-87695 U | 12/1994 |
| JP | H 0458001 A | 2/1995 |
| JP | H 08-93696 A | 4/1996 |
| JP | H 08-312582 A | 11/1996 |
| JP | 10-301575 A | 11/1998 |
| JP | H 10-318194 A | 12/1998 |
| JP | H 11-294879 A | 10/1999 |
| JP | 2005009483 A | 1/2005 |
| JP | 2007-315925 A | 12/2007 |
| JP | 2008-009483 A | 1/2008 |
| JP | 2008-20095 A | 1/2008 |
| JP | 2008020095 A | 1/2008 |
| WO | WO 96/15397 A1 | 5/1996 |
| WO | WO 97/18549 A1 | 5/1997 |
| WO | WO 02/052109 A1 | 7/2002 |
| WO | WO 02/052110 A1 | 7/2002 |

OTHER PUBLICATIONS

Liu, Zheji, and Hill, D. Lee, "Centrifugal Compressor Noise Reduction by Using Helmholtz Resonator Arrays", Proceedings of the 30th Turbomachinery Symposium, Sep. 17-20, 2001, Houston, TX, 6 pages.

Liu, Zheji, Kuzdzal, Mark J., Atkins P.E., Kenneth E., and Rials, Randy, "Diagnosis and Solution of High Noise and Vibration Issues After a Propylene Refrigeration Compression Re-Rate," Proceedings of ASME Turbo Expo 2010: Power for Land Sea and Air, GT2010-22014, Jun. 14-18, 2010, Glasgow, UK, 9 pages.

Liu, Zheji, and Hill, D. Lee, "On Reducing Piping Vibration Levels—Attacking the Source," Proceedings of ASME Turbo Expo 2002, GT-2002-30278, Jun. 3-6, 2002, Amsterdam, The Netherlands, 7 pages.

Liu, Zheji, Marczak P.E., Mike, and Kiteck, P.E., Paul, "Reducing Compressor Station Ambient Noise Level by Controlling Compressor Internal Noise Source", Proceedings of IPC'02 4th International Pipeline Conference, Sep. 29-Oct. 3, 2002, Calgary, Alberta, Canada, 11 pages.

Liu, Zheji, and Kuzdzal, Mark J., "Noise Control of an 11,000 Horsepower Single Stage Pipeline Centrifugal Compressor", Proceedings of GT2007 ASME Turbo Expo 2007: Power for Land, Sea and Air, GT2007-27422, May 14-17, 2007, Montreal, Canada, 8 pages.

Bielak, Gerald W., and Premo, John W., "Advanced Turbofan Duct Liner Concepts", National Aeronautics and Space Administration (NASA), CR-1999-209002, Langley Research Center, Feb. 1999, 124 pages.

Liu, Fei, and Horowitz, Stephen; Nishida, Toshikazu; Cattafesta, Louis, and Sheplak, Mark, "A multiple degree of freedom electromechanical Helmholtz resonator", Journal of Acoustical Society of America, Jul. 2007, pp. 291-301 (11).

Liu, Zheji, Kuzdzal, Mark J., and Peikli, Vegard, "Reduction of Noise Emission from Centrifugal Compressor Discharge and Suction Pipelines by Duct Resonator Arrays", 10 pages.

Liu, Zheji, and Kuzdzal, Mark J., "Noise Reduction of a Multistage Export/Reinjection Centrifugal Compressor Through the Use of Duct Resonator Arrays", 20 pages.

PCT/US01/47515—Notification of Transmittal of International Search Report, International Search Report dated Apr. 18, 2002, 6 pages.

PCT/US01/47515—Notification of Transmittal of International Preliminary Examination Report, International Preliminary Examination Report, mailed Mar. 25, 2003, 5 pages.

PCT/US96/18491—International Search Report, mailed Apr. 4, 1997, 3 pages.

PCT/US01/02984—Notification of Transmittal of International Search Report, International Search Report dated Apr. 27, 2001, 6 pages.

PCT/US01/02984—Corrected Notification of Transmittal of International Preliminary Examination Report dated Apr. 21, 2004, 4 pages.

(56) References Cited

OTHER PUBLICATIONS

PCT/US10/21867—Notification of Transmittal of International Search Report and Written Opinion of the International Searching Authority, International Search Report and Written Opinion of the International Searching Authority, mailed Mar. 8, 2010, 8 pages.
PCT/US10/21867—Notification Concerning Transmittal of International Preliminary Report on Patentability, International Preliminary Report on Patentability, mailed Nov. 17, 2011, 8 pages.
PCT/US10/21870—Notification Concerning Transmittal of International Preliminary Report on Patentability, International Preliminary Report on Patentability, mailed Apr. 1, 2011, 13 pages.
PCT/US10/21870—Notification of Transmittal of International Search Report and Written Opinion of the International Searching Authority, International Search Report, Written Opinion of the International Searching Authority, mailed Mar. 8, 2010, 10 pages.
PCT/EP00/02445—Notification of Transmittal of International Search Report, International Search Report mailed Jun. 8, 2000, 5 pages.
PCT/EP99/09516—Written Opinion dated Sep. 19, 2000, 3 pages.
PCT/EP99/09516—Notification of Transmittal of International Search Report, International Search Report dated Apr. 20, 2000, 5 pages.
EP 01 99 6188—Supplementary European Search Report, completed Aug. 19, 2004, 1 page.
EP 01 90 5217—Supplementary European Search Report dated Aug. 30, 2004, 3 pages.
EP 03 00 3484—European Search Report dated Jun. 2, 2003, 3 pages.
EP 04 25 1912—European Search Report dated Jan. 26, 2006, 3 pages.
EP 04 00 1560—European Search Report, completed Aug. 25, 2004, 2 pages.

\* cited by examiner

MULTI-DEGREE OF FREEDOM RESONATOR ARRAY

The present application is a national stage application of PCT Pat. App. No. PCT/US2012/031244, filed Mar. 29, 2012, which claims priority to U.S. patent application Ser. No. 61/477,530, which was filed Apr. 20, 2011. These priority applications are hereby incorporated by reference in their entirety into the present application, to the extent that they are not inconsistent with the present application.

BACKGROUND

Acoustic resonators are used in rotating machinery, such as turbomachines, to reduce pressure pulsation, vibrations, and noise. The use of acoustic resonators provides several advantages, including lowering noise emissions. One type of resonator is known as a Helmholtz resonator, which typically includes a chamber with a throat oriented toward the acoustical source. Such Helmholtz resonators can be positioned in arrays within the machinery, for example, as acoustic liners positioned proximal the flowpath, thereby reducing the acoustical energy emanating therefrom.

Conventional Helmholtz resonators, however, are typically effective over a relatively narrow frequency band, for example, about one octave. Accordingly, multi-degree of freedom resonator arrays have been developed to provide effective attenuation of a broader frequency band of noise and vibration. Passive multi-degree of freedom arrays are generally constructed from multiple layers of acoustic liners. As such, acoustical energy passes through two or more sets of resonators, thereby attenuating the noise and vibration over a broader frequency band. Active multi-degree of freedom arrays have been proposed that actively alter in geometry, such as electromechanical Helmholtz resonators, with results similar to passive arrays.

These multi-degree of freedom resonator arrays, while generally suitable in a variety of applications, are often expensive to manufacture, bulky, and, especially in the case of active resonators, can add complexity to the system, thereby increasing the chances for system failure. What is needed is a multi-degree of freedom resonator array that does not suffer from these drawbacks and/or others.

SUMMARY

Embodiments of the disclosure may provide an exemplary apparatus for attenuating noise and vibration. The apparatus may include a first base plate having first base plate perforations defined therethrough, and first and second spacers each extending from the first base plate, being spaced apart from each other, and defining a first channel therebetween. The apparatus may also include a first insert disposed in the first channel and having insert perforations defined therethrough, the first base plate, the first and second spacers, and the first insert at least partially defining a first acoustic chamber therebetween, wherein the base plate perforations and the insert perforations are in communication with the first acoustic chamber.

Embodiments of the disclosure may further provide an exemplary method for attenuating acoustical energy in a turbomachine. The method may include transmitting acoustical energy in base plate perforations defined through a first base plate, and transmitting the acoustical energy through the base plate perforations into a first acoustic chamber defined between the first base plate and first and second faces of an insert positioned between spacers extending from the first base plate. The method may also include transmitting the acoustical energy from the first acoustic chamber through insert perforations defined in at least one of the first and second faces of the insert, and transmitting the acoustical energy from the insert perforations into a second acoustic chamber at least partially defined by at least one of the first and second faces, a third face, and a wall. The method may further include transmitting the acoustical energy back through the insert perforations, the first acoustic chamber, and the base plate perforations.

Embodiments of the disclosure may also provide an exemplary resonator array for a compressor. The resonator array may include a base plate having base plate perforations defined therethrough, and spacers extending from the base plate and being spaced apart to define channels therebetween, each of the spacers having a top that abuts a wall of the compressor. The resonator array may also include inserts, each disposed in one of the channels and having insert perforations defined therein, each of the inserts and the base plate at least partially defining a first acoustic chamber therebetween, and each of the inserts and the wall at least partially defining a second acoustic chamber therebetween. The second acoustic chamber may be in fluid communication with the first acoustic chambers via the insert perforations and the first acoustic chamber may be in fluid communication with the base plate perforations.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
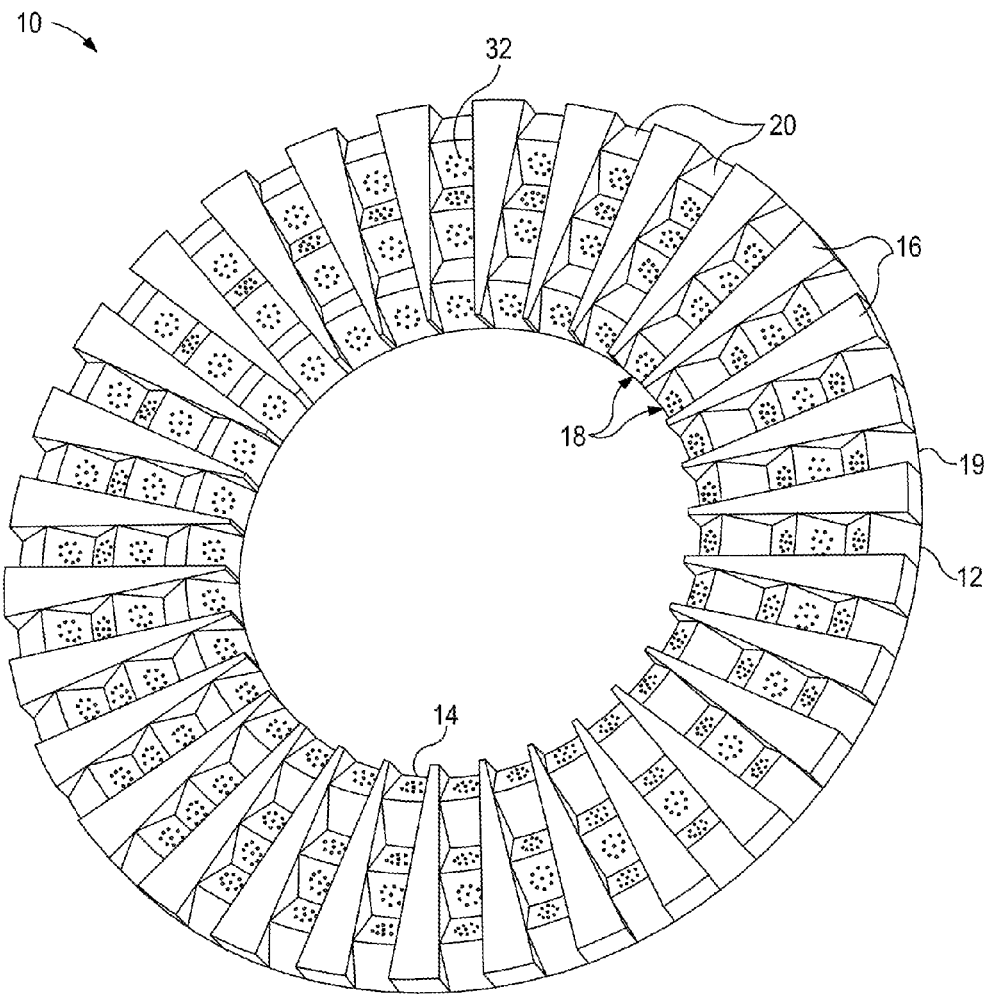
FIG. 1 illustrates an isometric view of an exemplary resonator array, according to one or more aspects of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates an isometric view of a resonator array 10 for attenuating acoustic energy, for example, in a turbomachine. The resonator array 10 generally includes a base plate 12, with a plurality of wedge-shaped spacers 16 extending therefrom, although in other embodiments the spacers 16 may have any other suitable shape. Inserts 20 are positioned between adjacent spacers 16. The inserts 20 may be generally ribbon-shaped and thus may have multiple faces. Moreover, the inserts 20 have perforations 32 defined therein. The insert perforations 32 may be defined in one, some, or all of the faces of the inserts 20. For example, the insert perforations 32 may be defined in every-other face of the inserts 20, in some adjacent faces, as shown, or may be defined in every face the inserts 20. Furthermore, the insert perforations 32 may positioned so as to be in fluid communication with perforations 22 defined in the base plate 12, as can be appreciated in FIGS. 2, 3, 6, and 7, for example.

Figure 6:
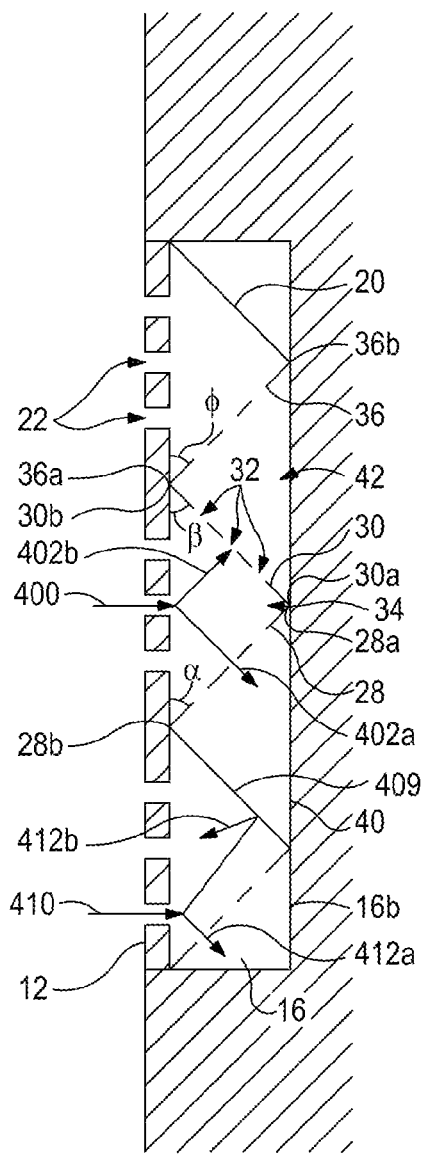
FIG. 6 illustrates a cross-sectional view of the resonator array of FIG. 5, taken along line 6-6, according to one or more aspects of the disclosure.
Figure 7:
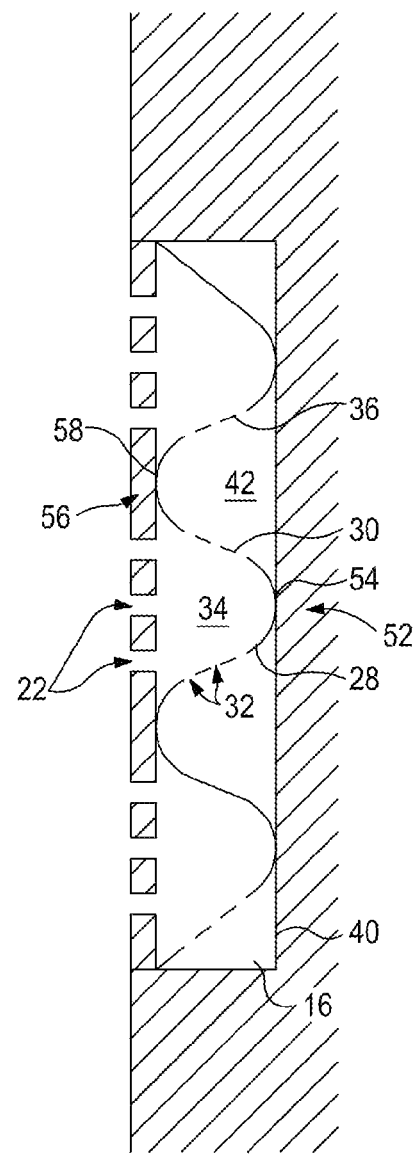
FIG. 7 illustrates a cross-sectional view similar to FIG. 6, depicting another embodiment of the resonator array, according to one or more aspects of the disclosure.

Further referring to FIGS. 6 and 7, the base plate 12, spacers 16, and inserts 20 together define first acoustic chambers 34 therebetween. The first acoustic chambers 34 are in communication with the base plate perforations 22 and the insert perforations 32. Second acoustic chambers 42 may also be defined by the wall 40 against which the resonator array 10 is disposed in the turbomachine, as well as the spacers 16 and the inserts 20. The second acoustic chambers 42 are in fluid communication with at least one of the first acoustic chambers 34 via the insert perforations 32. Accordingly, acoustic energy is attenuated by a series of acoustics resonators formed by the first acoustic chambers 34 and by the interconnected second acoustic chambers 42. As will be appreciated, the resonator array 10 may therefore be characterized as a multi-degree of freedom resonator. As such, the resonator array 10 provides an increased frequency band across which acoustic energy is attenuated and/or provides a greater overall acoustic energy attenuation.

Turning to the illustrated embodiments now in greater detail, the resonator array 10 depicted in FIG. 1 may be configured for use in a centrifugal compressor, for example, in a diffuser channel of one of the DATUM® family of compressors, commercially-available from Dresser-Rand Company of Olean, N.Y., USA; however, embodiments of the resonator array 10 may be advantageously employed with any type of turbomachine and/or may be positioned in other areas of the turbomachine, apart from the diffuser channel. As the term is used herein, "turbomachine" is generally defined to mean any machine capable of transferring energy to or from a process fluid. Turbomachines thus include all types of compressors, blowers, fans, pumps, gas turbines, steam turbines, etc.

The base plate 12 of the resonator array 10 may be generally annular and disk-shaped, as shown, and may define a bore 14 therethrough. The bore 14 may be configured to receive a shaft (not shown) and/or any other component of a turbomachine therethrough. Accordingly, the base plate 12 may be generally symmetric about a diametral line (not shown), but in other embodiments may be asymmetric. Furthermore, although a disk-shaped base plate 12 is illustrated, other geometries are contemplated herein, for example, polygonal, conical, cylindrical, tubular, etc.

The spacers 16 are coupled to and extend from the base plate 12. In the illustrated embodiment, with the base plate 12 being disk-shaped, the spacers 16 may extend in an axial direction from the base plate 12, as shown. As the term is used herein, "axial" is intended to refer to a direction orthogonal or substantially orthogonal to the face of the base plate 12. In other embodiments, the spacers 16 may extend in both axial directions from the base plate 12 and/or may lean or curve in any direction in addition to axial. Further, the spacers 16 may extend radially between the bore 14 and an outer circumference 19 of the base plate 12.

In an embodiment, the spacers 16 and the base plate 12 may be formed as a single piece, e.g., milled from a common blank, sintered, or cast as a single piece, such as by investment casting, a combination thereof, or the like. In other embodiments, however, the spacers 16 may be connected to the base plate 12 by welding, brazing, bonding, fastening, forging, connecting thereto via dovetail fittings, or the like. In other embodiments, any other suitable connection process may be used.

As shown, the spacers 16 are spaced circumferentially apart about the base plate 12 to define channels 18 therebetween. The channels 18 extend radially, generally parallel to pairs of adjacent spacers 16. The inserts 20 are disposed in the channels 18 to form the acoustic chambers 34 and/or 42 (e.g., FIGS. 6 and 7), as will be described in greater detail below. In various embodiments, the number of spacers 16 may vary according to the desired parameters of the application. The resonator array 10 may include any number of spacers 16; exemplary numbers of spacers 16 can range from about 3, about 5, about 10, about 15, about 20, or about 25 to about 35, about 40, about 50, about 75, or about 100, or more spacers 16.

Figure 2:
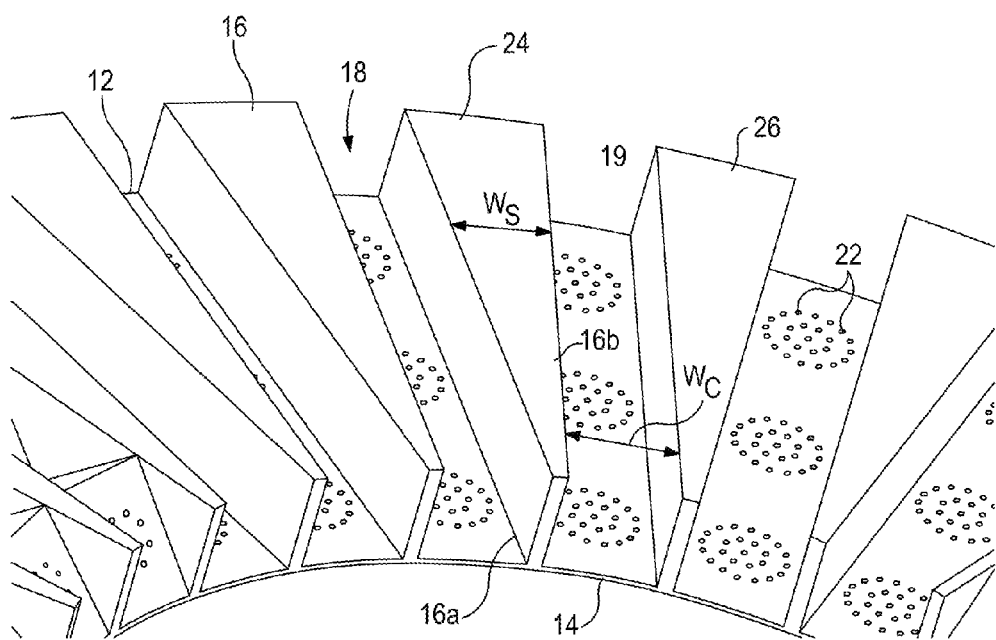
FIG. 2 illustrates an enlarged, partial, isometric view of an exemplary base plate of the resonator array, according to one or more aspects of the disclosure.
Figure 3:
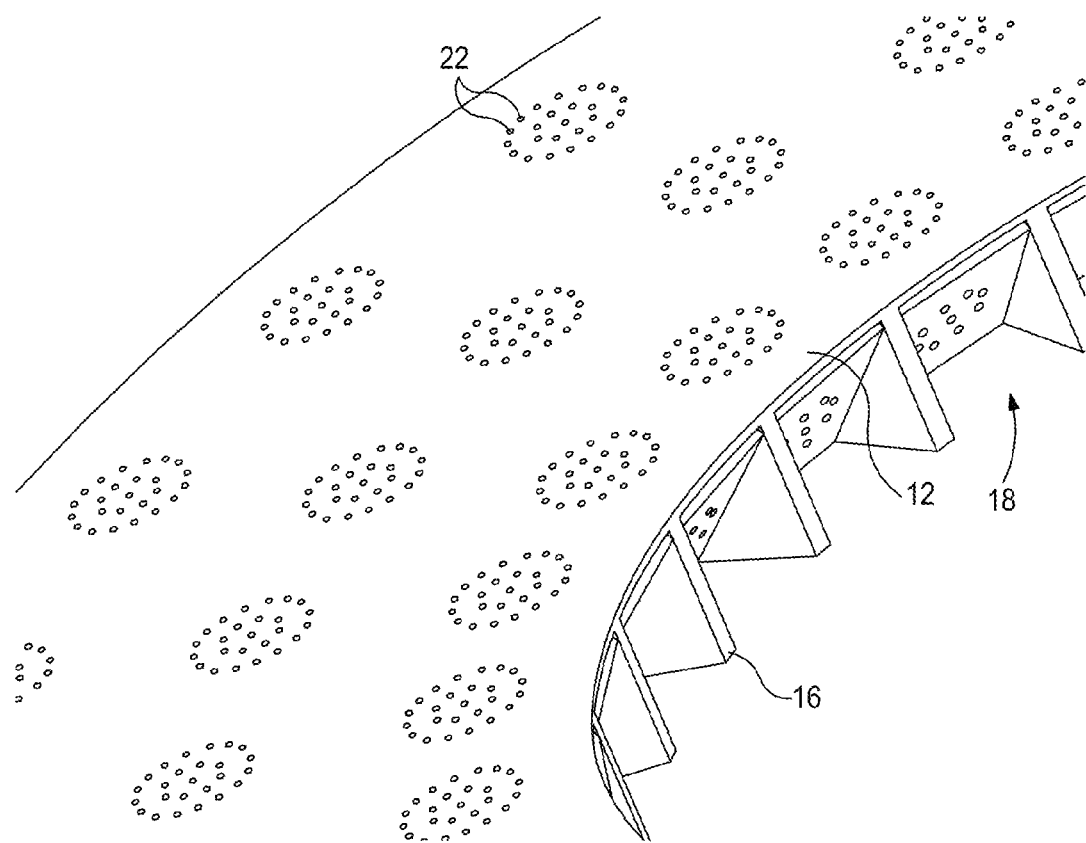
FIG. 3 illustrates another isometric view of the base plate of FIG. 2, illustrating the reverse side thereof, according to one or more aspects of the disclosure.

FIGS. 2 and 3 illustrate two enlarged, partial isometric views of the base plate 12, according to one or more embodiments. As shown, the spacers 16 each have a bottom 16a where they adjoin the base plate 12, and a top 16b. The aforementioned base plate perforations 22 are defined through the base plate 12 at positioned intervals such that they are communicable with the channels 19. The perforations 22 may be straight-through holes, as shown; however, one, some, or all may be chamfered, angled, or otherwise formed with a varying diameter, may be polygonal, or may have any other suitable shape. In some embodiments, at least some of the perforations 22 may connect together within the base plate 12, such that, for example, multiple smaller perforations 22 on one side of the plate become one larger perforation on the other side (not shown). In various embodiments, the base plate perforations 22 may be disposed in any pattern desired, or may be randomly arranged. For example, the base plate perforations 22 may be disposed in generally circular patterns, as shown. Further, the base plate perforations 22 may be aligned with the channels 18, such that the channels 18 are in communication with the opposite side (as shown in FIG. 3) of the base plate 12.

Referring to the spacers 16 in greater detail, the spacers 16 include at least first and second spacers 24, 26, which may be representative of any two of the spacers 16. The first and second spacers 24, 26 are adjacent, that is, proceeding circumferentially around the base plate 12 such that the first spacer 24 is next to the second spacer 26. Together, the first and second spacers 24, 26 define one of the channels 18 therebetween. As shown, the first and second spacers 24, 26 may each increase in width $W_S$ proceeding radially outward from the bore 14 toward an outer circumference 19 of the base plate 12. The expansion of the first and second spacers 24, 26 proceeding radially outward may correspond to the increasing circumference of the base plate 12, proceeding from the bore 14 to the outer circumference 19, such that a circumferential width $W_C$ of the channel 18 remains generally constant. Additionally, the circumferential width $W_C$ of the channel 18 may vary while the spacer width $W_S$ remains generally constant.

Figure 4:
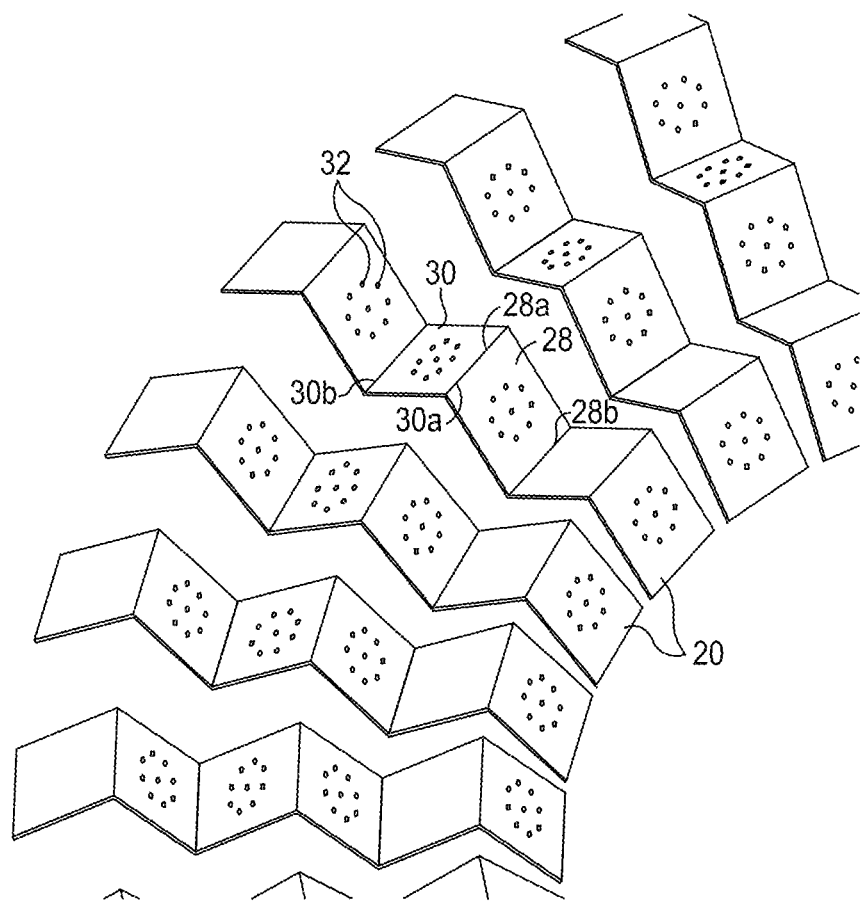
FIG. 4 illustrates an isometric view of several exemplary inserts for use with the base plate in the resonator array, according to one or more aspects of the disclosure.

FIG. 4 illustrates an isometric view of several of the inserts 20, according to an embodiment. The inserts 20 may be formed from plastic, sheet metal, ceramic, or the like, as desired. Accordingly, the inserts 20 may be bent, molded, formed, pieced together from smaller segments, or otherwise fabricated to define a ribbon shape. As such, the inserts 20 may each define at least first and second faces 28, 30, with the first face 28 having first and second sides 28a, 28b, and the second face 30 having first and second sides 30a, 30b. The first sides 28a, 30a are adjacent and may be coupled together or integrally-formed. It will be appreciated, however, that a portion of the insert 20, for example, another face (not shown) may be disposed between the first and second sides 28a, 30a, without departing from the definitions of "adjacent," "coupled," or "integrally-formed," as these terms are used herein.

The aforementioned insert perforations 32 may be defined in one or both of the first and second faces 28, 30. For example, each of the first and second faces 28, 30 may include one, two, three, five, ten or more insert perforations 32. Similar to the base plate perforations 22, the insert perforations 32 may be through-holes, may connect together, may be chamfered or otherwise have a varying diameter, and/or may be polygonal or any other suitable shape. Further, the insert perforations 32 may be disposed in any suitable pattern, such as the generally circular pattern shown, or may be disposed randomly, in no pattern at all. The insert perforations 32 may be formed in one, some, or all of the faces, including the first and second faces 28, 30, of each insert 20. Further, each insert 20 may define its own pattern, location, number, etc. of insert perforations 32, which may be the same or different than the remaining inserts 20.

Figure 5:
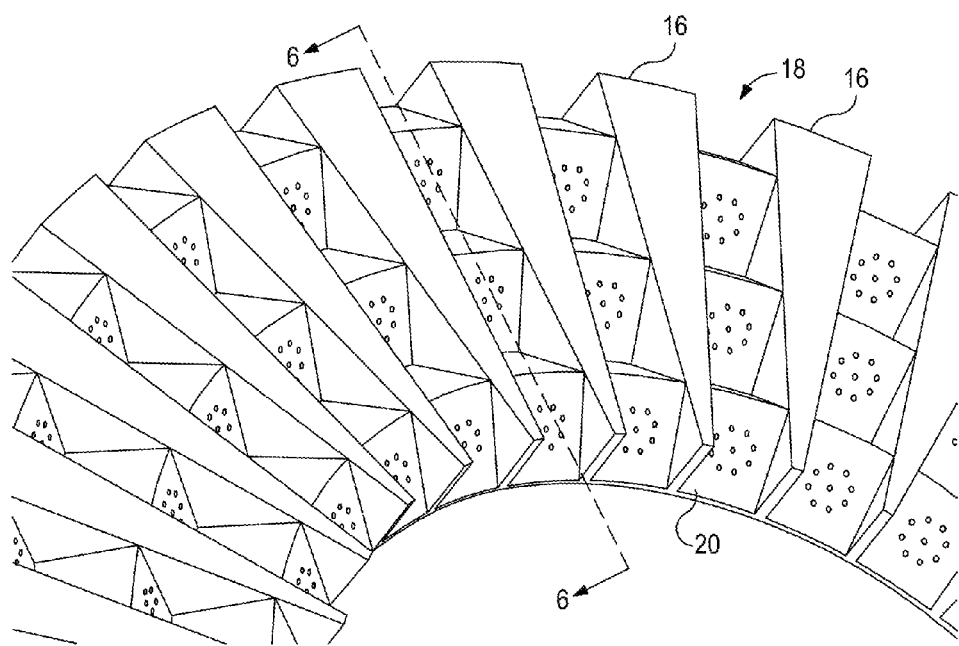
FIG. 5 illustrates an enlarged, partial, isometric view of the resonator array of FIG. 1, according to one or more aspects of the disclosure.

FIG. 5 illustrates an isometric view of the resonator array 10, according to an embodiment. As shown, the inserts 20 are disposed within the channels 18 between the spacers 16. The inserts 20 may be attached to the base plate 12 by any process, such as spot welding, bonding, fastening, being received into retaining channels (not shown), or the like. Additionally or alternatively, the inserts 20 may be fixed to the spacers 16. In other embodiments, however, the inserts 20 may not be fixed to either the base plate 12 or the spacers 16, but may instead rest snugly in the channels 18.

FIG. 6 illustrates a cross-sectional view of the resonator array 10 taken along line 6-6 of FIG. 5. As shown, the first face 28 may be disposed at an angle $\alpha$ with respect to the base plate 12. Similarly, the second face 30 may be disposed at an angle $\beta$ with respect to the base plate 12. The angles $\alpha$ and $\beta$ may be complementary, and, in one embodiment, may each be about 45 degrees. In other embodiments, the angles $\alpha$ and $\beta$ may each be between about 30 degrees and about 60 degrees and may or may not be complementary. In still other embodiments, the angles $\alpha$ and $\beta$ may be any suitable angles.

As shown, the second sides 28b, 30b of first and second faces 28, 30 may abut the base plate 12. With additional reference to FIG. 5, the first and second faces 28, 30, the base plate 12, and the adjacent spacers 16 may define a first acoustic chamber 34 therebetween. The base plate perforations 22 may be positioned such that they are aligned with the first acoustic chamber 34, so as to be in fluid communication therewith. Similarly, the insert perforations 32 may also be in fluid communication with the first acoustic chamber 34.

The insert 20 may also define a third face 36. The insert perforations 32 may further be defined in the third face 36; however, in other embodiments, the third face 36 may omit the insert perforations 32. The third face 36 may include a first side 36a, which abuts the base plate 12 and is adjacent, coupled to, and/or integrally-formed with the second side 30b of the second face 30, and a second side 36b. The third face 36 may be disposed at an angle $\phi$ with respect to the base plate 12. The angle $\phi$ may be the same, substantially the same as, or different than the angle $\alpha$.

The first sides 28a, 30a of the first and second faces 28, 30, respectively, and the second side 36b of the third face 36 may be offset from the base plate 12 by approximately the same distance as the top 16b of the spacers 16, and the top 16b of the spacers 16 may be disposed against a wall 40. In various embodiments, the wall 40 may be part of a diffuser channel of a compressor. This positioning of the resonator array 10 within the wall 40 of a diffuser channel may be similar to commonly-assigned U.S. Pat. No. 6,601,672, the entirety of which is incorporated herein by reference to the extent consistent with the present disclosure.

Accordingly, the wall 40, the spacers 16, and the second and third faces 28, 36 of the insert 20 may define a second acoustic chamber 42. The second acoustic chamber 42 may be in fluid communication with the first acoustic chamber 34 via the insert perforations 32 defined in the second and/or third faces 30, 36.

In some embodiments, the insert 20 may include repeating iterations of the first and second faces 28, 30, and in such an embodiment, the third face 36 of one iteration may be the first face 28 of another iteration. Accordingly, a plurality of the first acoustic chambers 34 may be defined between the insert 20 and the base plate 12, and a plurality of the second acoustic chambers 42 may be defined between the insert 20 and the wall 40. Some or all of the second acoustic chambers 42 may be in fluid communication with the first acoustic chambers 34 via the insert perforations 32 formed in the first and/or second faces 28, 30.

FIG. 7 illustrates a partial cross-sectional view, similar to that of FIG. 6, but depicting another embodiment of the resonator array 10. As shown, the insert 20, while still falling within the definition of "ribbon-shaped," now defines a sine-wave geometry. Accordingly, the first face 28 and the second face 30 define a ridge 52 where the insert 20 bows towards the wall 40, reaching its upper apex 54 adjacent thereto. The second face 30 and the third face 36 may define a trough 56 where the insert 20 bows towards the base plate 12, reaching its lower apex 58 adjacent thereto. It will be appreciated that the terms "ridge" and "trough," as they are used herein, are intended to refer to areas of the insert 20, but generally do not require any particular geometry for the insert 20; thus, the ridges 52 and/or troughs 56 being rectilinear or including additional bowing of the insert 20 is contemplated herein.

The first acoustic chamber 34 may be defined between the ridge 52 and the base plate 12, and the second acoustic chamber 42 may be defined between the trough 56 and the wall 40. The sine-wave geometry of the insert 20 may be repeating, such that multiple ridges 52 and troughs 56, and thus multiple first and second acoustic chambers 34, 42 may be formed. Further, the first, second, and/or third faces 28, 30, 36 may have the insert perforations 32 defined therein, as shown, but, in other embodiments any of the faces 28, 30, 36 may omit the insert perforations 32. Accordingly, the first and second acoustic chambers 34, 42 may be in fluid communication with one another and with the base plate perforations 22.

Referring to FIGS. 1-7, the various embodiments of the resonator array 10 described above provide multi-degree of freedom Helmholtz resonators for use in turbomachines, including pipes connected to such turbomachines. The general operating principles of Helmholtz resonators are well-known in the art and need not be described in detail herein, with it being expected that an understanding thereof informs the operation of the resonator array 10.

Referring specifically to FIG. 6, but with continued reference to FIGS. 1-5 and 7, in one example of such operation, the acoustical energy communicates with the first acoustic chamber 34 via the base plate perforations 22, as illustrated schematically by arrows 400 and 410. When the acoustical energy proceeds into the first acoustic chamber 34, it may also travel through the insert perforations 32 into one or more second acoustic chambers 42, as illustrated schematically by arrows 402a, 402b. Accordingly, in an example in which insert perforations 32 are on both of the first and second faces 28, 30 defining the first acoustic chamber 34, the resonator array 10 provides at least a three degree of freedom system.

On the other hand, in embodiments in which the insert perforations 32 are not in both of the first and second faces 28, 30, the resonator array 10 may provide a two-degree of freedom resonator. As such, the acoustical energy proceeds through the base plate perforations 22, as illustrated by arrow 410, may proceed into the first acoustic chamber 34, and then exit the first acoustic chamber 34 via the insert perforations 32 provided on the first or second face 28 or 30, as shown by arrow 412a, and/or interact with the imperforate face 409, as shown by arrow 412b.

Figure 8:
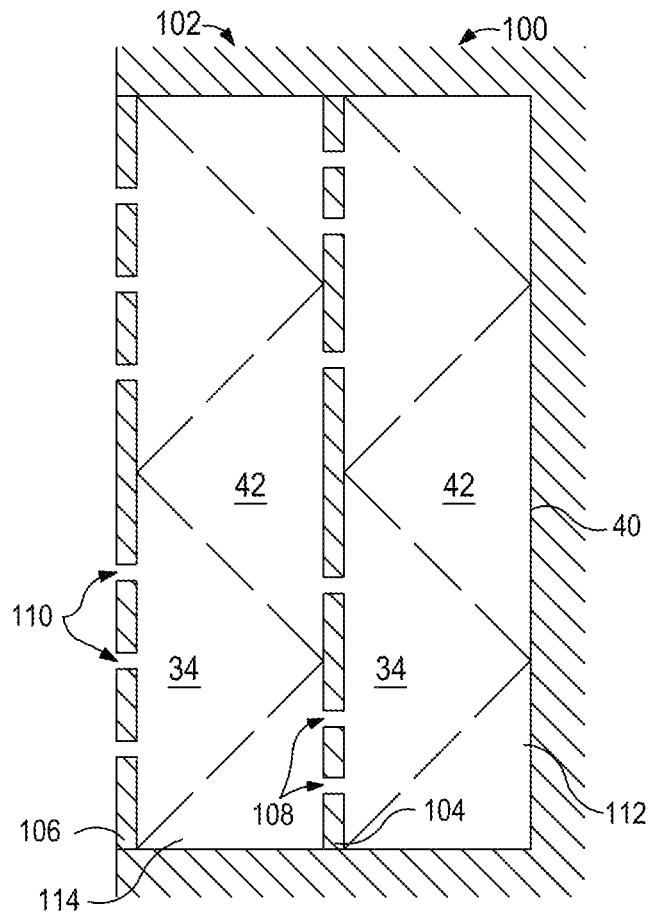
FIG. 8 illustrates a cross-sectional view of another embodiment of the resonator array, according to one or more aspects of the disclosure.

FIG. 8 illustrates a partial cross-sectional view, similar to FIGS. 6 and 7, but depicting of a pair of stacked resonator arrays 100, 102. Each of the resonator arrays 100, 102 may be constructed similarly to one or more embodiments of the resonator array 10 described above and may be best understood with reference thereto. Each resonator array 100, 102 includes a base plate 104, 106, respectively, having base plate perforations 108, 110 defined therein, respectively. Spacers 112, 114 may extend axially from the base plates 104, 106, respectively. As shown, the wall, described above with reference to FIG. 6, of the resonator array 102 is provided by the base plate 104 of the resonator array 100. Furthermore, although not shown, additional resonator arrays may be stacked on the resonator array 100, such that the base plate 12 (see, e.g., FIG. 6) of such an additional resonator array 10 provides the wall 40 abutting the resonator array 100.

Operation of the stacked resonator arrays 100, 102 may be generally similar to that described above for the resonator array 10. However, a second set of first and second acoustic chambers 34, 42 may be provided, some or all of which may be in fluid communication with each other. Accordingly, acoustical waves may proceed into and out of multiple acoustic chambers 34, 42, thereby increasing the number of degrees of freedom.

Figure 9:
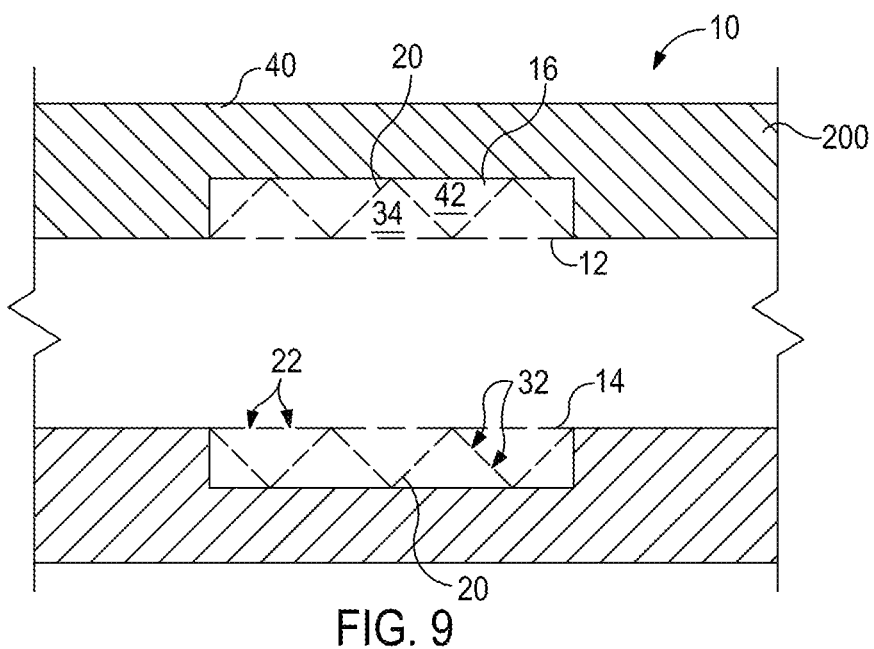
FIG. 9 illustrates a cross-sectional view of another embodiment of the resonator array, according to one or more aspects of the disclosure.

FIG. 9 illustrates a cross-sectional view of the resonator array 10, according to another embodiment. As can be appreciated, the resonator array 10 may be tubular in shape, rather than disk-shaped. For example, the spacers 16 of the resonator array 10 may proceed axially, such that the channels 18 (see, e.g., FIG. 5) also extend axially. The inserts 20 are disposed in the channels 18, and thus also extend axially, rather than radially, therein. Furthermore, the base plate 12 may define the bore 14, and the tops 16b of the spacers 16 may define the radial outermost extent of the base plate 12 and may abut the wall 40. In various embodiments, the wall 40 may be part of a pipe 200, for example, forming a recess into which the resonator array 10 is received. The pipe 200 may be an inlet pipe or an outlet pipe, through which fluid is introduced to or removed from a turbomachine. In other embodiments, multiple resonator arrays 10 may be stacked together, such that the base plate 12 of one provides the wall 40 of another.

Operation of the resonator array 10 illustrated in FIG. 9 may be generally the same as the embodiments of the resonator arrays 10 described above with reference to FIGS. 1-8. Furthermore, the resonator array 10 illustrated in FIG. 9 may be stacked, as described in FIG. 8, while retaining the tubular shape of the base plate 12. Accordingly, such a stacked, tubular embodiment may operate in substantially the same manner as described above with respect to FIG. 8.

Figure 10:
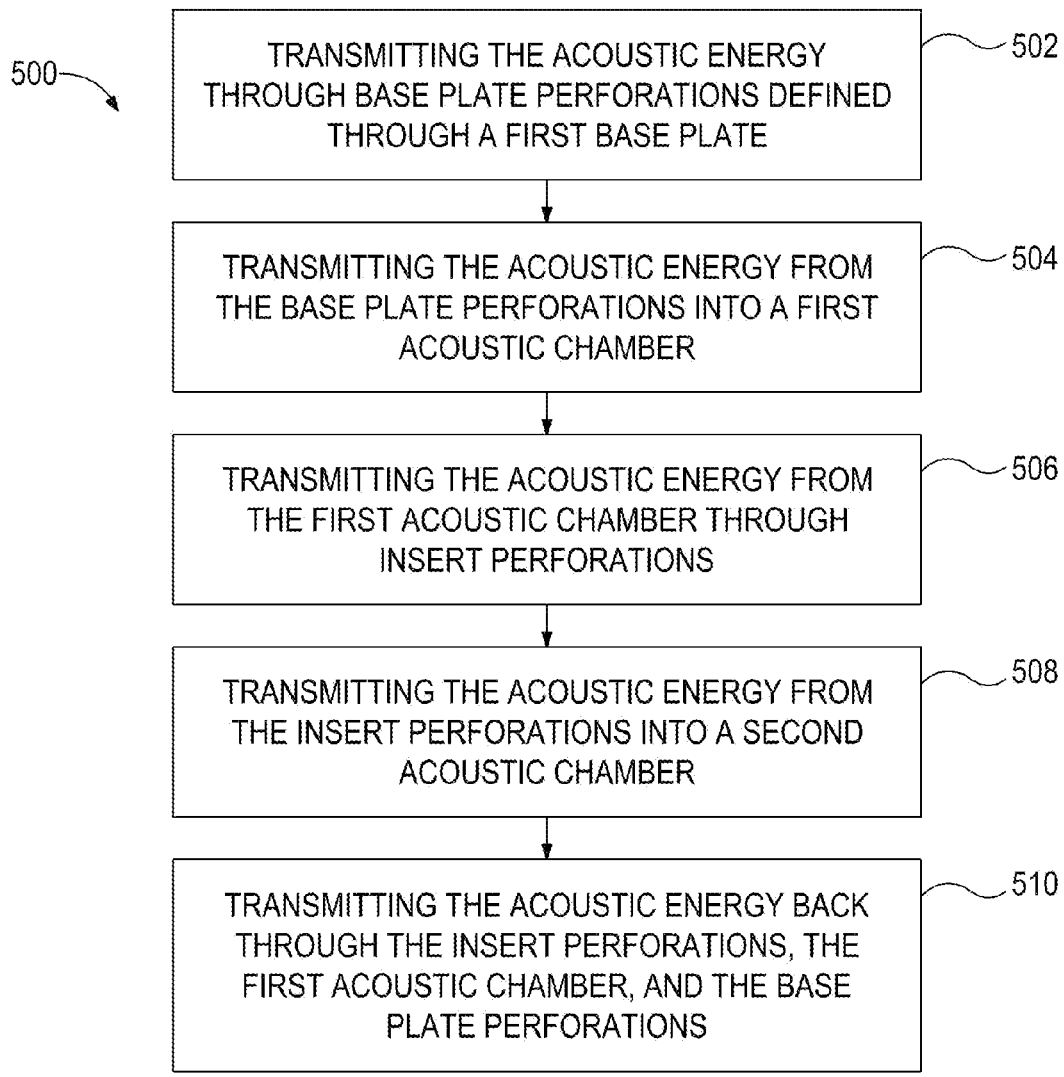
FIG. 10 illustrates a flowchart of an exemplary method for attenuating vibration in a turbomachine, according to one or more aspects of the disclosure.

FIG. 10 illustrates a flowchart of a method 500 for attenuating acoustical energy in a turbomachine, according to one or more embodiments. The method 500 may proceed by operation of one or more of the acoustic resonators 10 described above with reference to FIGS. 1-9 and, therefore, may be best understood with reference thereto. In an embodiment, the turbomachine for use with the method 500 is a compressor, for example, a centrifugal compressor.

The method 500 may include transmitting acoustical energy through base plate perforations defined in a first base plate, as at 502. The method 500 may also include transmitting the acoustical energy from the base plate perforations into a first acoustic chamber defined between the first base plate and first and second faces of an insert positioned between spacers coupled to the first base plate, as at 504. The method 500 may further include transmitting the acoustical energy from the first acoustic chamber through insert perforations defined in at least one of the first and second faces of the insert, as at 506. The method 500 may additionally include transmitting the acoustical energy from the insert perforations into a second acoustic chamber at least partially defined by at least one of the first and second faces, a third face, and a wall, as at 508. In an embodiment, the wall may be part of a structure defining a diffuser channel and may thus be referred to as being adjacent to the diffuser channel. In another embodiment, however, the wall may be part of a fluid inlet pipe of the turbomachine or part of a fluid outlet pipe of the turbomachine.

The method 500 may also include transmitting the acoustical energy back through the insert perforations, the first acoustic chamber, and the base plate perforations, as at 510. Further, the method may also include transmitting the acoustical energy through second base plate perforations defined in a second base plate into a second acoustic chamber defined between the first base plate and the second base plate.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. An apparatus for attenuating noise and vibration, comprising:
   a first base plate having first base plate perforations defined therethrough;
   first and second spacers each extending from the first base plate, being spaced apart from each other, and defining a first channel therebetween;
   a first insert disposed in the first channel and having first insert perforations defined therethrough, the first base plate, the first and second spacers, and the first insert at least partially defining a first acoustic chamber therebetween, wherein the first base plate perforations and the first insert perforations are in communication with the first acoustic chamber; and
   a second base plate coupled to the first base plate, wherein a second insert is disposed on the second base plate, and the second insert and the first base plate at least partially define a second acoustic chamber therebetween.

2. The apparatus of claim 1, wherein the first base plate is an annular disk and the first and second spacers extend axially therefrom such that the first channel extends radially.

3. The apparatus of claim 1, wherein the first base plate is tubular and the first and second spacers extend radially-outward therefrom such that the first channel extends axially.

4. The apparatus of claim 1, wherein the first insert is ribbon-shaped.

5. The apparatus of claim 1, wherein the first insert includes a ridge and a trough, the first acoustic chamber being defined between the ridge and the first base plate.

6. The apparatus of claim 5, wherein the first and second spacers abut a wall, and a third acoustic chamber is defined between the wall, the first and second spacers, and the trough of the first insert, the third acoustic chamber being in fluid communication with the first acoustic chamber via the first insert perforations.

7. The apparatus of claim 1, wherein the first insert includes a first face and a second face, the first insert perforations being defined in at least one of the first and second faces, the first face being disposed at a first angle with respect to the first base plate and the second face being disposed at a second angle with respect to the first base plate.

8. The apparatus of claim 7, wherein:
   the first face includes first and second sides; and
   the second face includes first and second sides, the first sides of the first and second faces being coupled together, and the second sides of the first and second faces abutting the first base plate to at least partially define the first acoustic chamber.

9. The apparatus of claim 8, wherein the first insert further comprises a third face having first and second sides, the second side of the third face disposed adjacent to the second side of the second face, the third face being disposed at a third angle with respect to the first base plate.

10. The apparatus of claim 9, wherein:
    the first and second spacers each include a bottom disposed adjacent to the first base plate, and a top disposed adjacent to a wall; and
    the first sides of the first, second, and third faces of the first insert being disposed adjacent to the wall such that a third acoustic chamber is at least partially defined between the second and third faces and the wall, the third acoustic chamber being in fluid communication with the first acoustic chamber via the first insert perforations.

11. The apparatus of claim 1, wherein the second base plate further comprises:
    second base plate perforations defined therethrough; and
    first and second spacers extending axially therefrom and spaced circumferentially apart to define a second channel therebetween, wherein
      the second insert defines second insert perforations therein and is disposed in the second channel,
      the second insert and the second base plate at least partially define a third acoustic chamber therebetween, and
      the third acoustic chamber is in fluid communication with the first acoustic chamber via the first base plate perforations and the second insert perforations.

12. The apparatus of claim 1, further comprising:
    a plurality of spacers including the first and second spacers, coupled to the first base plate and extending therefrom, and being spaced apart circumferentially to define channels including the first channel therebetween; and
    a plurality of inserts including the first insert, each having at least one of the first insert perforations defined therethrough and each disposed in a corresponding one of the channels.

13. A method for attenuating acoustical energy in a turbomachine, comprising:
    transmitting acoustical energy in first base plate perforations defined through a first base plate;
    transmitting the acoustical energy through the first base plate perforations into a first acoustic chamber defined between the first base plate and first and second faces of an insert positioned between spacers extending from the first base plate;
    transmitting the acoustical energy from the first acoustic chamber through insert perforations defined in at least one of the first and second faces of the insert;
    transmitting the acoustical energy from the insert perforations into a second acoustic chamber at least partially defined by at least one of the first and second faces, a third face, and a wall;
    transmitting the acoustical energy back through the insert perforations, the first acoustic chamber, and the first base plate perforations; and transmitting the acoustical energy through second base plate perforations defined in a second base plate into a third acoustic chamber defined between the first base plate and the second base plate.

14. The method of claim 13, wherein the turbomachine is a compressor and the wall is adjacent to a diffuser channel.

15. The method of claim 14, wherein the wall is part of a fluid inlet pipe of the turbomachine or part of a fluid outlet pipe of the turbomachine.

16. A resonator array for a compressor, comprising:
a base plate having base plate perforations defined therethrough;
spacers extending from the base plate and being spaced apart to define channels therebetween, each of the spacers having a top that abuts a wall of the compressor; and
inserts, each disposed in one of the channels and having insert perforations defined therein, each of the inserts and the base plate at least partially defining a first acoustic chamber therebetween, and each of the inserts and the wall at least partially defining a second acoustic chamber therebetween, the second acoustic chamber being in fluid communication with the first acoustic chambers via the insert perforations and the first acoustic chamber being in fluid communication with the base plate perforations.

17. The resonator array of claim 16, wherein the base plate is tubular, and the spacers extend radially outward therefrom such that the channels are axial in orientation.

18. The resonator array of claim 16, wherein the base plate is annular, and the spacers extend axially from the base plate such that the channels are radial in orientation.

19. The resonator array of claim 16, wherein each of the inserts defines a ridge and a trough, the first acoustic chamber being defined between the ridge and the base plate and the second acoustic chamber being defined between the trough and the wall.

* * * * *